United States Patent
Gosselin et al.

(10) Patent No.: US 6,976,179 B1
(45) Date of Patent: Dec. 13, 2005

(54) POWER MANAGEMENT IN MOBILE COMPUTER FOR ALLOCATING POWER TO PERIPHERAL DEVICE WHEN VERSION OF EXPANSION PORT MAY SUPPORT SECOND AMOUNT OF POWER

(75) Inventors: Robert Gosselin, Dublin, CA (US); Ronald Marianetti, II, Morgan Hill, CA (US)

(73) Assignee: Palm, Inc., Sunnyvale, CA (US)

( * ) Notice: Subject to any disclaimer, the term of this patent is extended or adjusted under 35 U.S.C. 154(b) by 739 days.

(21) Appl. No.: 09/896,018

(22) Filed: Jun. 28, 2001

Related U.S. Application Data

(63) Continuation-in-part of application No. 09/374,056, filed on Aug. 12, 1999, now Pat. No. 6,539,476.

(51) Int. Cl.⁷ ................................................. G06F 1/26
(52) U.S. Cl. ........................ 713/300; 320/132; 702/63; 710/14
(58) Field of Search .......................... 320/132; 702/63; 713/300; 710/14

(56) References Cited

U.S. PATENT DOCUMENTS

| | | | | |
|---|---|---|---|---|
| 5,027,294 A | * | 6/1991 | Fakruddin et al. | 713/300 |
| 5,532,945 A | * | 7/1996 | Robinson | 713/321 |
| 5,842,027 A | * | 11/1998 | Oprescu et al. | 713/300 |
| 6,157,169 A | * | 12/2000 | Lee | 320/132 |

OTHER PUBLICATIONS

3Com, "CoreBuilder 5000 ATM BackBone SwitchModule Quick Start and Reference", 1999.*

* cited by examiner

*Primary Examiner*—Chun Cao
*Assistant Examiner*—Albert Wang
(74) *Attorney, Agent, or Firm*—Fenwick & West LLP

(57) ABSTRACT

The present invention introduces a power management system interface for a mobile computer system. The power management system interface allows peripheral devices to query the present power situation before activating peripheral devices that will draw power. Furthermore, peripheral devices register their power usage with the operating system such that the operating system can accurately determine the remaining power available in the battery.

15 Claims, 7 Drawing Sheets

| | Original Mobile Computer with Original Expansion Interface | New Mobile Computer with New Expansion Interface |
|---|---|---|
| Peripheral Designed For Original Expansion Interface | Peripheral operates within the originally designed specifications for the original expansion interface. | Peripheral operates within the originally designed specifications for the original expansion interface. Updated software for old peripherals may use some new software features of the new expansion interface. |
| Peripheral Designed For New Expansion Interface | Peripheral operates within the originally designed specifications for the original expansion interface if possible, alert user of any limited functionality or problems. | Peripheral operates using the specifications for the new expansion interface. |

Figure 2

| Pin | Name | I/O/P[1] | Function | Pin | Name | I/O/P[1] | Function |
|---|---|---|---|---|---|---|---|
| 1 | GND | P | Ground | 35 | GND | P | Ground |
| 2 | D3 | I/O | Data bit 3 | 36 | CD1* | O | Tie to Ground |
| 3 | D4 | I/O | Data bit 4 | 37 | D11 | I/O | Data bit 11 |
| 4 | D5 | I/O | Data bit 5 | 38 | D12 | I/O | Data bit 12 |
| 5 | D6 | I/O | Data bit 6 | 39 | D13 | I/O | Data bit 13 |
| 6 | D7 | I/O | Data bit 7 | 40 | D14 | I/O | Data bit 14 |
| 7 | CS0* | I | Chip Select 0 | 41 | D15 | I/O | Data bit 15 |
| 8 | A10 | I | Address Bit 10 | 42 | CS1* | I | Chip Select 1 |
| 9 | OE* | I | Output Enable | 43 | N.C. | N.C. | No Connection |
| 10 | A11 | I | Address bit 11 | 44 | N.C. | N.C. | No Connection |
| 11 | A8 | I | Address bit 8 | 45 | N.C. | N.C. | No Connection |
| 12 | A9 | I | Address bit 9 | 46 | A17 | I | Address bit 17 |
| 13 | A13 | I | Address bit 13 | 47 | A18 | I | Address bit 18 |
| 14 | A14 | I | Address bit 14 | 48 | A19 | I | Address bit 19 |
| 15 | WE* | I | Write Enable | 49 | A20 | I | Address bit 20 |
| 16 | IRQ* | O | Interrupt Request | 50 | A21 | I | Address bit 21 |
| 17 | $V_{CC}$ | P | Card $V_{CC}$, 3.3V | 51 | $V_{CC}$ | P | Card $V_{CC}$, 3.3V |
| 18 | $V_{DOCK}$ | P | Dock Power | 52 | $V_{DOCK}$ | P | Dock Power |
| 19 | A16 | I | Address bit 16 | 53 | A22 | I | Address bit 22 |
| 20 | A15 | I | Address bit 15 | 54 | A23 | I | Address bit 23 |
| 21 | A12 | I | Address bit 12 | 55 | N.C. | N.C. | No Connection |
| 22 | A7 | I | Address bit 7 | 56 | N.C. | N.C. | No Connection |
| 23 | A6 | I | Address bit 6 | 57 | N.C. | N.C. | No Connection |
| 24 | A5 | I | Address bit 5 | 58 | RESET* | I | Reset |
| 25 | A4 | I | Address bit 4 | 59 | N.C. | N.C. | No Connection |
| 26 | A3 | I | Address bit 3 | 60 | MIC+ | I | Microphone+ |
| 27 | A2 | I | Address bit 2 | 61 | MIC- | I | Microphone- |
| 28 | A1 | I | Address bit 1 | 62 | N.C. | N.C. | No Connection |
| 29 | A0 | I | Address bit 0 | 63 | LOWBAT* | I | Low Battery |
| 30 | D0 | I/O | Data bit 0 | 64 | D8 | I/O | Data bit 8 |
| 31 | D1 | I/O | Data bit 1 | 65 | D9 | I/O | Data bit 9 |
| 32 | D2 | I/O | Data bit 2 | 66 | D10 | I/O | Data bit 10 |
| 33 | N.C. | N.C. | No Connection | 67 | CD2* | O | Tie to Ground |
| 34 | GND | P | Ground | 68 | GND | P | Ground |

1. Denotes Input, Output, or Power with respect to the peripheral device.
* Denotes active-low signals.

Figure 3

| Pin | Name | I/O/P[1] | Function | Pin | Name | I/O/P[1] | Function |
|---|---|---|---|---|---|---|---|
| 1 | GND | P | Ground | 35 | GND | P | Ground |
| 2 | D3 | I/O | Data bit 3 | 36 | CD1* | O | Tie to Ground |
| 3 | D4 | I/O | Data bit 4 | 37 | D11 | I/O | Data bit 11 |
| 4 | D5 | I/O | Data bit 5 | 38 | D12 | I/O | Data bit 12 |
| 5 | D6 | I/O | Data bit 6 | 39 | D13 | I/O | Data bit 13 |
| 6 | D7 | I/O | Data bit 7 | 40 | D14 | I/O | Data bit 14 |
| 7 | CS0* | I | Chip Select 0 | 41 | D15 | I/O | Data bit 15 |
| 8 | A10 | I | Address Bit 10 | 42 | CS1* | I | Chip Select 1 |
| 9 | OE* | I | Output Enable | 43 | N.C. | N.C. | No Connection |
| 10 | A11 | I | Address bit 11 | 44 | N.C. | N.C. | No Connection |
| 11 | A8 | I | Address bit 8 | 45 | N.C. | N.C. | No Connection |
| 12 | A9 | I | Address bit 9 | 46 | A17 | I | Address bit 17 |
| 13 | A13 | I | Address bit 13 | 47 | A18 | I | Address bit 18 |
| 14 | A14 | I | Address bit 14 | 48 | A19 | I | Address bit 19 |
| 15 | WE* | I | Write Enable | 49 | A20 | I | Address bit 20 |
| 16 | IRQ* | O | Interrupt Request | 50 | A21 | I | Address bit 21 |
| 17 | $V_{CC}$ | P | Card Vcc, 3.3V | 51 | $V_{CC}$ | P | Card Vcc, 3.3V |
| 18 | $V_{DOCK}$ | P | Dock Power 5 - 12V | 52 | $V_{DOCK}$ | P | Dock Power 5 - 12V |
| 19 | A16 | I | Address bit 16 | 53 | A22 | I | Address bit 22 |
| 20 | A15 | I | Address bit 15 | 54 | A23 | I | Address bit 23 |
| 21 | A12 | I | Address bit 12 | 55 | $V_{BAT+}$ | P | Raw Battery+ |
| 22 | A7 | I | Address bit 7 | 56 | $V_{BAT-}$ | P | Raw Battery- |
| 23 | A6 | I | Address bit 6 | 57 | N.C. | N.C. | No Connection |
| 24 | A5 | I | Address bit 5 | 58 | RESET* | I | Reset |
| 25 | A4 | I | Address bit 4 | 59 | N.C. | N.C. | No Connection |
| 26 | A3 | I | Address bit 3 | 60 | MIC+ | I | Microphone+ |
| 27 | A2 | I | Address bit 2 | 61 | MIC- | I | Microphone- |
| 28 | A1 | I | Address bit 1 | 62 | N.C. | N.C. | No Connection |
| 29 | A0 | I | Address bit 0 | 63 | LOWBAT* | I | Low Battery |
| 30 | D0 | I/O | Data bit 0 | 64 | D8 | I/O | Data bit 8 |
| 31 | D1 | I/O | Data bit 1 | 65 | D9 | I/O | Data bit 9 |
| 32 | D2 | I/O | Data bit 2 | 66 | D10 | I/O | Data bit 10 |
| 33 | N.C. | N.C. | No Connection | 67 | CD2* | O | Tie to Ground |
| 34 | GND | P | Ground | 68 | GND | P | Ground |

1. Denotes Input, Output, or Power with respect to the peripheral device.
* Denotes active-low signals.

Figure 4

|  | Original Mobile Computer with Original Expansion Interface | New Mobile Computer with New Expansion Interface |
| --- | --- | --- |
| Peripheral Designed For Original Expansion Interface | Peripheral operates within the originally designed specifications for the original expansion interface. | Peripheral operates within the originally designed specifications for the original expansion interface. Updated software for old peripherals may use some new software features of the new expansion interface. |
| Peripheral Designed For New Expansion Interface | Peripheral operates within the originally designed specifications for the original expansion interface if possible, alert user of any limited functionality or problems. | Peripheral operates using the specifications for the new expansion interface. |

POWER MANAGEMENT IN MOBILE COMPUTER FOR ALLOCATING POWER TO PERIPHERAL DEVICE WHEN VERSION OF EXPANSION PORT MAY SUPPORT SECOND AMOUNT OF POWER

RELATED APPLICATIONS

This application is a continuation in-part application of the patent application titled "A Mobile Computer System with A Robust Expansion Capability", filed on Aug. 12, 1999, having Ser. No. 09/374,056 now U.S. Pat. No. 6,539,476.

FIELD OF THE INVENTION

The present invention relates to the field of mobile computer systems. In particular the present invention discloses a power management system for an external expansion interface of a mobile computer system.

BACKGROUND OF THE INVENTION

Mobile computer systems have become a very popular form of computing device. Mobile computer systems allow users to access large amounts of personal information such as an address book, a personal calendar, and a list of to-dos. In particular, the PalmOS® based palm-sized computer systems that use the Palm Operating System from Palm Computing, Inc of Santa Clara, Calif. have become the de facto standard of handheld computer systems.

To provide additional functionality, it is desirable to include an external hardware interface on the mobile computer system. The Palm® series of palm-sized computer systems from Palm Computing, Inc of Santa Clara, Calif. include an external serial interface for communicating with external peripherals. The Handspring® line of Visor® palm-sized computer systems include a Springboard® expansion port that allows even more sophisticated peripherals to be added.

There are few limits on the types of peripherals that peripheral designers may create for palm-sized computer systems. Currently available peripherals for palm-sized computer systems include Global Positioning System (GPS) receivers, MPEG audio layer 3 (MP3) players, barcode laser scanners, cellular modems, ordinary telephone line modems, cellular telephones, digital cameras, flash memory storage, and software read-only-memory (ROM) packs.

To allow peripheral designers as much freedom as possible, it would be desirable to provide the peripheral designers with as many computer resources as possible without rendering the palm-sized computer system impractical. One common need of most computer peripherals is electrical power. Thus, it would be desirable to provide peripheral designers with ample electrical power. However, the electrical power must be supplied without harming the ordinary operation of the palm-sized computer system.

SUMMARY OF THE INVENTION

The present invention introduces a power management system interface for a mobile computer system. The power management system interface allows peripheral devices to query the present power situation before activating peripheral devices that will draw power. Furthermore, peripheral devices register their power usage with the operating system such that the operating system can accurately determine the remaining power available in the battery.

Other objects, features, and advantages of present invention will be apparent from the company drawings and from the following detailed description.

BRIEF DESCRIPTION OF THE DRAWINGS

The objects, features, and advantages of the present invention will be apparent to one skilled in the art in view of the following detailed description in which:

FIG. 2 illustrates a first electrical interface from a first embodiment of an expansion interface for a mobile computer system as illustrated in FIGS. 1A and 1B.

FIG. 3 illustrates a second electrical interface from a second embodiment of an expansion interface for a mobile computer system as illustrated in FIGS. 1A and 1B.

FIG. 4 illustrates a table summarizing how old and new peripherals operate in old and new mobile computer systems.

DETAILED DESCRIPTION OF THE PREFERRED EMBODIMENT

A method and apparatus for implementing a robust external interface for a computer system is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to handheld computer system. However, the same techniques can easily be applied to any other type of computer system.

Original Extensible Mobile Computer System

Figure 1A:
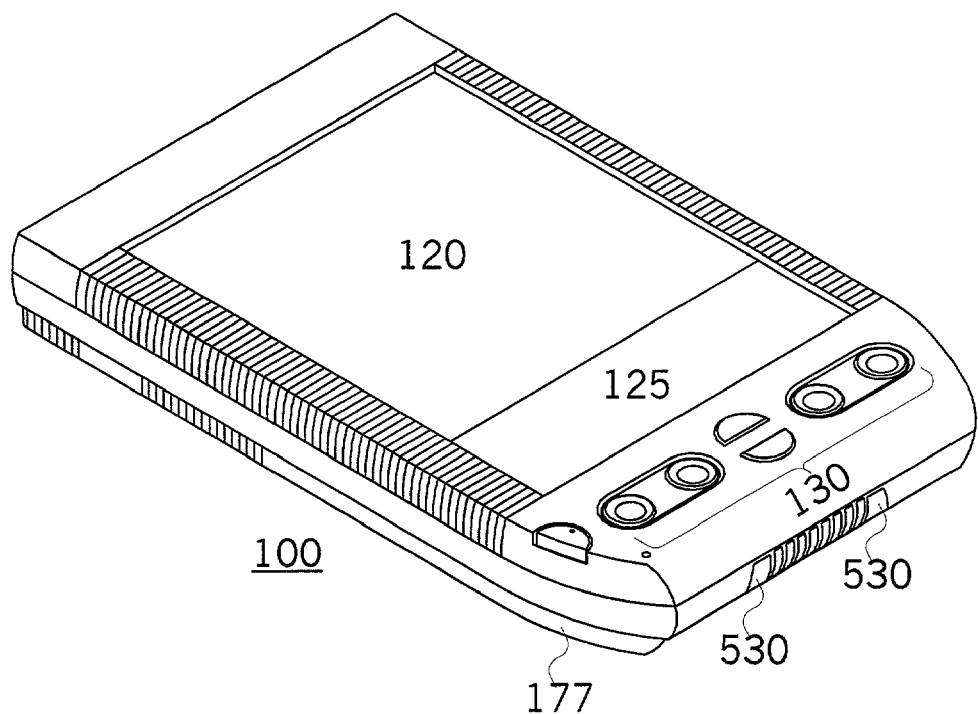
FIGS. 1A and 1B illustrate a mobile computer system with an external peripheral interface.
Figure 1B:
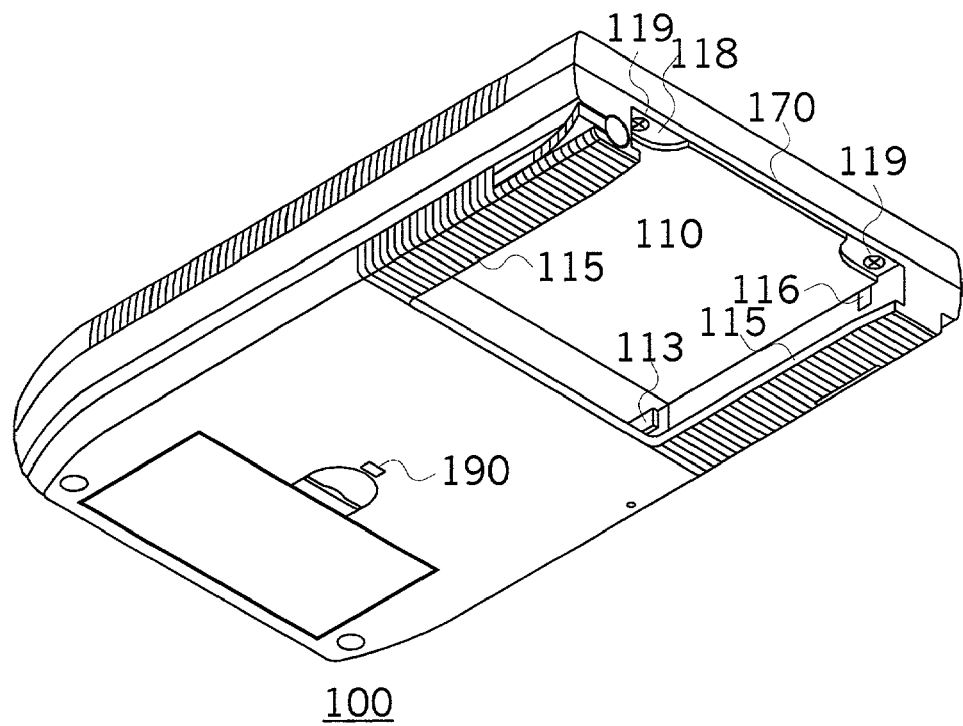

FIGS. 1A and 1B illustrate a mobile computer system 100 that includes an expansion interface 110. The expansion interface allows peripheral devices to be inserted and coupled directly to a data bus of the mobile computer system 100. In one embodiment, an interrupt line from the processor in the mobile computer system 100 is coupled to the expansion interface 110 such that the processor can detect when a peripheral device has been inserted or removed. Furthermore, a second interrupt line may be provided as an electrical signal on the expansion interface 110 such that a peripheral device inserted into the expansion interface 110 may interrupt the processor of the mobile computer system 100 and request particular processing tasks to be performed.

FIG. 2 illustrates a first embodiment for an electrical interface of the expansion interface 110 illustrated in FIGS. 1A and 1B. As illustrated in FIG. 2, the expansion interface supplies power supply voltage $V_{cc}$ of 3.1 to 3.6 Volts on pins 17 and 51 of the expansion interface 110. The $V_{cc}$ power supply voltage is a regulated output of the switching power supply of the mobile computer system 100. In a first embodiment of the electrical interface of the expansion interface 110, the peripheral designers were informed that only 100 milliamps of electrical current could be drawn from the $V_{cc}$ power supply voltage on pins 17 and 51 of the expansion interface 110.

If the peripheral designer wanted any additional power, that peripheral designer would have to incorporate an additional battery into the peripheral device. If the peripheral designer incorporated a rechargeable battery, that rechargeable battery could be recharged with the $V_{dock}$ power signal on pins 18 and 52. The $V_{dock}$ power signal was designed to receive power from a docking cradle when the mobile computer system 100 was placed into the docking cradle. In one particular embodiment, the.

Follow-On Extensible Mobile Computer Systems

FIG. 3 illustrates a second electrical interface the expansion interface of for follow-on mobile computer systems. As illustrated in FIG. 3, the second electrical interface also supplies a power supply voltage $V_{cc}$ of 3.1 to 3.6 Volts on pins 17 and 51 of the expansion interface. In this manner, the second electrical interface is backwards compatible with peripherals designed for the first electrical interface of FIG. 2.

The second electrical interface of FIG. 3 also includes a second power signals $V_{BATT}+$ and $V_{BATT}-$ on pins 55 and 56, respectively. As illustrated in FIG. 2, the $V_{BATT}+$ and $V_{BATT}-$ power signals are not available on earlier models. The $V_{BATT}+$ and $V_{BATT}-$ power signals provide an unregulated power signal directly from the battery of the mobile computer system. The $V_{BATT}+$ and $V_{BATT}-$ power signals are typically capable of providing more current than the output of the switching power supply $V_{cc}$. Thus, the second embodiment of FIG. 3 provides peripheral designers with an additional power supply option.

Power Management Protocol

As set forth in the preceding sections, a follow-on mobile computer system product may not have the exact same expansion interface as earlier mobile computer system products. Even though the expansion interface may have changed, ideally the later mobile computer system should still be able to use peripherals designed for the earlier mobile computer system. Thus, the electrical interface of the later mobile computer system should be designed to be "backwards-compatible" with the electrical interface of the earlier mobile computer system. However, a peripheral designed specifically for the later the mobile computer system could have difficulty operating in the earlier mobile computer system. Thus, the present invention introduces a new power management protocol in order to allow a peripheral designed in view of the later of the mobile computer system expansion interface operate in the earlier mobile computer system.

The power management protocol of the present invention allows new peripheral devices to use the new features of new mobile computer systems. However, the power management protocol also ensures that any permutation of old or new peripherals and mobile computer systems will operate to some degree or at least inform the user if the system can not operate properly.

FIG. 4 illustrates the four permutations of old and new peripherals and old and new mobile computer systems. As set forth in the first column of the first row of FIG. 4, the original peripherals designed for the original expansion interface will always operate within the specifications for the original expansion interface. Thus, the original peripherals will operate normally in older mobile computer systems with the original expansion interface.

Now referring to the second column of the first row in FIG. 4, the original peripherals will operate normally in the newer mobile computer systems that are designed to be backwards compatible with the older expansion interface. However, such original (or "legacy") peripherals will generally not take advantage of any new features offered by the newer mobile computer systems. It may be possible to update the software associated with an older peripheral device in order to have that older peripheral use new software features. For example, an older peripheral device with an updated software driver may register its power usage as will be described later.

The second row of FIG. 4 describes how newer peripherals designed for the newer expansion interface behave in older and newer mobile computer systems. As set forth in the first column of the second row, a new peripheral inserted into an older mobile computer system with the original expansion interface must operate within the limitations of the original expansion interface. When installed in the older original expansion interface, some new peripheral module may operate partially and some may not work at all. For example, a variable speed modem may only operate at lower speeds when installed in an original expansion interface but when installed in a new expansion interface, the modem may operate at higher speeds. Some newer peripherals may require specific features only available in the new expansion interface such that those newer peripherals cannot operate within the specifications of the original expansion interface at all. Such a newer peripheral device that cannot operate should inform the user that it is unable to operate and then disable itself.

Finally, when a new peripheral is inserted into a mobile computer system equipped with the new expansion interface, the new peripheral can operate in its full capacity, as set forth in the second column of the second row in FIG. 4. The new peripheral device may operate in a manner that takes full advantage of all the features of the new expansion interface.

Expansion Interface Version Detection

To allow newer peripherals to determine if a new expansion interface is being used, the program code within each new peripheral device should call query the operating system to determine the expansion interface version that is available in the mobile computer system. In one PalmOS embodiment, this is accomplished by calling the PalmOS operating system routine:

*error=FtrGet(hsFtrCreator, hsFtrIDVersion, &VariableAddress)* where:
 error is a variable for storing a returned error code value;
 hsFtrCreator is a constant.
 hsFtrIDVersion is a constant that specifies a command for obtaining the Version number; and
 VariableAddress is a pointer to a location for storing an output result. Specifically, it will contain a revision # that will indicate the presence of the new API.

If the returned error code specifies no error then the Handspring extensions are present. The current version of the Handspring extensions is returned in the location pointed to by the VariableAddress parameter. If the version indicates that the expansion interface is the older expansion interface, then the peripheral device must operate within the specified parameters of the older original expansion interface. For example, the peripheral device should not draw more than 100 milliamps of electrical current from the power supply. Furthermore, the $V_{BATT}+$ and $V_{BATT}-$ power signals will not be available. Such a new peripheral device may need to operate using its own internal power supply if more than 100 milliamps of current is required.

Older peripherals will not attempt to detect if a newer expansion interface is available since such older peripherals have no information about the newer expansion interface. Such devices will operation within the specifications of the original expansion interface.

Power Management Programming Interface

In one embodiment, all the power management software functionality is accessed with a single power management routine known as "HsCardPower( )". Different power management functionality is requested by specifying a particular power management command with an input parameter, hsCardPowerCmd. In one embodiment, the HSCardPower( ) routine is activated as follows:

error=HsCardPower(cardNo, hsCardPowerCmd, VariableAddress);

where:
    error is a variable for storing a returned error code value;
    cardNo is a sixteen bit unsigned integer that specifies a peripheral card number;
    hsCardPowerCmd is a thirty-two bit integer that specifies a particular command; and
    VariableAddress is a pointer to a variable that either contains an input parameter or a pointer to a location for storing an output result.

The following table provides a list of the different hsCardPowerCmd commands available and how each command is used. The Variable In/Out column specifies if the "VariableAddress" address supplied for the third parameter is a pointer to an input parameter or a pointer to a memory location for storing an output result.

| Command | In/Out | Command Description |
| --- | --- | --- |
| HsCardPowerCmdBatteryCapacity | Out | Returns the total Capacity of battery in milliwatt hours. Note that this measurement does not indicate the current charge level of the battery - this is the battery's theoretical maximum capacity when fully charged. |
| hsCardPowerCmdBatteryPercent | Out | Returns the current level of the battery as a percent value between 0 and 100. |
| hsCardPowerCmdBatteryVoltage | Out | Returns the current battery voltage in millivolts. |
| hsCardPowerCmdTotalLoad | Out | Returns the current total load on the battery in milliwatts. |
| hsCardPowerCmdCardLoad | Out | Returns amount of load currently registered to the specified card in milliwatts. This is a portion of the total load returned by related command hsCardPowerCmdTotalLoad. |
| hsCardPowerCmdAvailablePower | Out | Returns the amount of additional power that could be supplied to the card in milliwatts. Peripheral device software should use this command before activating hardware that will consume additional power. If there is enough power available to activate the device, the hsCardPowerAddLoad command needs to be used next in order to register the actual additional power load. |
| hsCardPowerCmdAddLoad | In | Registers additional load of the peripheral card in milliwatts as specified in the third parameter. This call should be made to register the peripheral card's base power consumption during peripheral card installation. It must also be called anytime the power consumption of the peripheral card increases. |
| hsCardPowerCmdRemoveLoad | In | Reduces registered load of the peripheral card in milliwatts as specified in the third parameter. This call should be made to un-register the peripheral card's base power consumption during peripheral card removal. It must also be called anytime the power consumption of the peripheral card decreases. |
| hsCardPowerCmdCurrentMaxVcc | Out | Maximum sustained current available from the $V_{CC}$ supply in milliamps. This value is dependent upon the mobile computer system model. This is a fixed value. |
| hsCardPowerCmdCurrentMaxVBat | Out | Maximum sustained current available from the $V_{BAT}$ supply in milliamps. Will return a zero (0) if there is no $V_{BAT}$ on this mobile computer system mobile. |
| hsCardPowerCmdVccMin | Out | Minimum voltage of the $V_{CC}$ supply in millivolts. This is a fixed value. |
| hsCardPowerCmdVccMax | Out | Maximum voltage of the $V_{CC}$ supply in millivolts. This is a fixed value. |
| hsCardPowerCmdVccNominal | Out | Nominal voltage of the $V_{CC}$ supply in millivolts. This is a fixed value. |
| hsCardPowerCmdVBatMin | Out | Minimum voltage of the $V_{BAT}$ supply in millivolts. This is a fixed value. Will return a zero (0) if there is no $V_{BAT}$ power available on this mobile computer system model. |
| hsCardPowerCmdVBatMax | Out | Maximum voltage of the $V_{BAT}$ supply in millivolts. This is a fixed value. Will return a zero (0) if there is no $V_{BAT}$ power available on this mobile computer system model. |
| hsCardPowerCmdVBatNominal | Out | Nominal voltage of the $V_{BAT}$ supply in millivolts. This is a fixed value. Will return a zero (0) if there is no $V_{BAT}$ power available on this mobile computer system model. |

Power Management Programming Example

To best illustrate how the Power Management Interface of the present invention is used, an example of power management code for a peripheral device is provided.

Figure 5:
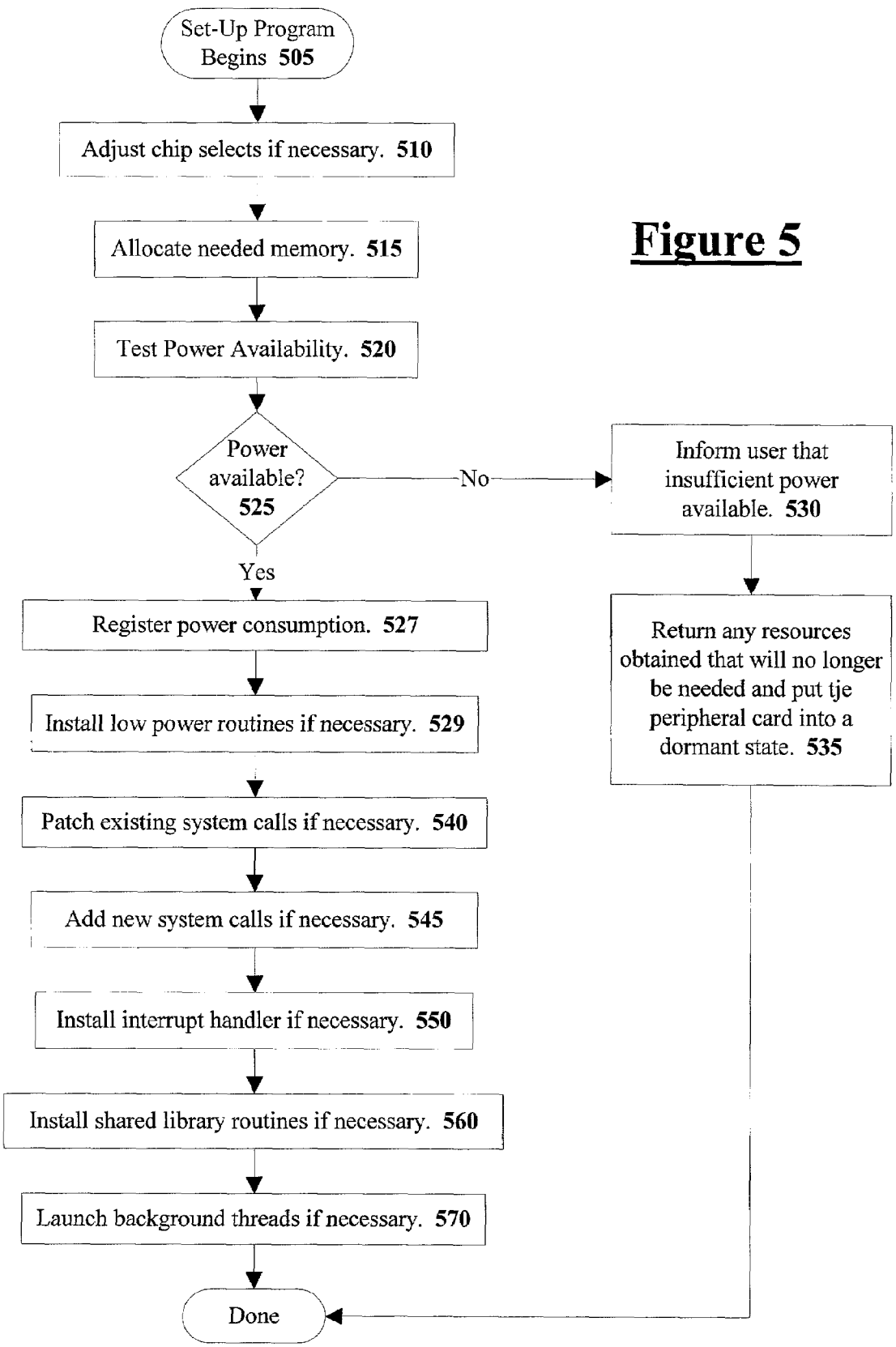
FIG. 5 illustrates a flow diagram for one possible set-up utility that uses the power management interface.

When a peripheral device is installed into an expansion interface as set forth in the patent application titled "A Mobile Computer System with A Robust Expansion Capability", filed on Aug. 12, 1999, having Ser. No. 09/374,056, the peripheral device executes "set-up" utility that performs various operations to prepare the peripheral device for operation. FIG. 5 illustrates one embodiment of a set-up utility program for a peripheral device that uses the Power Management Interface. FIG. 5 provides a list of operations that may be performed by a set-up utility. The reader should note that not all steps in FIG. 5 must be performed by all set-up utility applications. Each peripheral set-up utility application will only perform the operations necessary to prepare the installed peripheral device for operation. Furthermore, the set-up utility application may perform additional operations not listed in FIG. 5.

Referring to FIG. 5, the set-up utility program begins at step 505. At step 510, the set-up utility may adjust the operation of the chip selects used to address the memory on the inserted peripheral device. The set-up utility program modifies the chip select policy to properly handle the actual size of memory & I/O address space contained within the peripheral device. The chip select policy is adjusted using the actual size of memory & I/O address space required by the peripheral software.

At step 515, the set-up utility allocates an amount of main memory that the peripheral card needs for operation. The main memory will be used to store state variables associated with the peripheral device. Memory is allocated by the set-up utility since some systems do not allow the allocation of memory within interrupt routines.

With the Power Management Interface of the present invention, each peripheral that uses power should first ensure that enough power is available to operate the peripheral before activating the peripheral. At step 520, the set-up utility of the peripheral tests to see if there is sufficient power available. In one embodiment, the set-up utility calls a routine that returns the amount of available power in milliwatts. The set-up utility compares the returned available power value to a needed amount of power at step 525. If there is not enough power, then the set-up utility informs the user that the peripheral cannot operate due to insufficient power at step 530 and returns any resources that were reserved that will not be needed at step 535. The following computer code can be used to implement the test and comparison of steps 520 and 525:

```
// Variable Declarations (for all example code)
Err err;                     // Variable for returned error code.
UInt16 cardNo = 1;           // This code uses Card #1.
UInt32 NeededPower = 100;    // This peripheral needs 100 milliwatts.
UInt32 available;            // Variable for storing available power.
UInt32 additionalLoad;       // A variable for storing an additional load.
UInt32 reducedLoad;          // A variable for storing a reduced load.
UInt32 percent;    // A variable for storing % of power available.
//---------------------------------------------------------------
// See how much power is available. Returns available power in
// milliwatts into the 'available' variable.
//---------------------------------------------------------------
   err = HsCardPower(cardNo, hsCardPowerCmdAvailablePower,
   &available);
```

```
if (available >= NeededPower)
  {
    //Continue setup of inserted peripheral card.
  }
// add code that informs user that the peripheral cannot
// be used due to a lack of power. Return any resources that
// were obtained that will not be needed.
```

If the test and comparison of steps 520 and 525 succeeded, then the set-up utility must inform the operating system about the power that it will draw. At step 527, the set-up utility registers the power that it will use with the operating system using the "hsCardPowerAddLoad" command. The following program code illustrates how a peripheral card set-up utility can register its power usage with the "hsCardPowerAddLoad" command at step 527:

```
//---------------------------------------------------------------
// Register additional power usage.
// This example registers an additional load of 100 milliwatts.
//---------------------------------------------------------------
additionalLoad = 100; // Specify the additional power load in mW
   // Now inform the OS about the power consumption.
err = HsCardPower (cardNo, hsCardPowerAddLoad, &additionalLoad);
```

To conserve power when possible, most mobile computer devices have a power management system that allows power to be saved by turning off circuits and devices that are not being used. To reduce power consumption, the peripheral device may install power management routines at step 529 that will be called by the operating system at appropriate times. For example, a power off routine may be called when the user of the mobile computing device turns off the mobile computing device. Similarly, an idle power down routine may be called when the mobile computing device has been idle for a pre-determined period. A low power routine may also be called by the operating system when the battery is low.

At step 540, the set-up utility patches systems calls if necessary. In one embodiment, system calls may be listed in a jump table that contains a list of vectors to system calls. The set-up utility may patch a system call by copying a new system call routine into main memory and then changing the vector in the jump table to point to the new system call.

At step 545, the set-up utility may install new system calls. The new system calls may provide additional functionality to the operating system of the computer system. Some applications may be designed to use this additional functionality if and when this additional functionality becomes available due to the insertion of a peripheral device.

At step 550, the set-up utility may install a peripheral device interrupt handler. In one embodiment, an interrupt line is coupled to the expansion interface on the mobile computer system. The newly installed peripheral device interrupt handler would obtain control of the processor at any time when an interrupt on the expansion interface interrupt line is asserted.

Many peripherals will provide services to other application programs. For example, a wireless networking peripheral may provide network services such as TCP/IP to other application programs. To provide the services to the other applications, the peripheral card may provide a set of shared libraries that may be accessed by other applications. The set-up utility should install such shared libraries as designated in step 560 of FIG. 5.

Some peripherals will require background tasks to monitor activities on the peripheral device. The set-up utility should launch such background threads at step 570. One possible use for a background task associated with a peripheral device is to monitor the power situation and adjust the operation of the peripheral card accordingly. For example, the following code tests the battery condition and executes a routine to change the power consumption if the percent of power available drops below ten:

```
//----------------------------------------------------------------
// See if battery is dangerously low. If it's below some threshold
// (example here is 10%), then change the power mode. Each card
// must implement its own logic for putting its hardware into a low
// power mode for battery depletion and powerdown situations.
//----------------------------------------------------------------
    // Get the % of power remaining.
err = HsCardPower (cardNo, hsCardPowerCmdBatteryPercent, &percent);
if (percent <10) // Test if less than 10% power left.
{
    // Begin code to change power consumption.
    // One method of changing power consumption is to enter a low-power
    // state. This routine must be provided by the card developer
    // and depends on the hardware present in the peripheral card.
    PutCardIntoLowPowerMode ( );
}
```

In the preceding example code listing, the program code puts the peripheral card into a low power consumption mode. In alternate embodiments, the program code may ask the user to connect the device to an external power source or add a new battery to the peripheral device in order to prolong its operation. If the program code turns off the peripheral card device, then the peripheral card must register the reduced power load with the operating system. The following code describes how the peripheral code "unregisters" its usage of the 100 milliwatts:

```
//----------------------------------------------------------------
// Register reduced power usage.
// This example registers a reduction in load of 100 milliwatts.
//----------------------------------------------------------------
reducedLoad = 100; // Specify the reduced power load in milliwatts
    // Now inform the OS about the reduced power consumption.
err = HsCardPower (cardNo, hsCardPowerCmdRemoveLoad,
    &reducedLoad);
```

Referring back to FIG. 5, once the set-up utility has completed execution, the peripheral device is ready for operation. If the peripheral device provides shared services, those services are now available. If the peripheral device is controlled by a dedicated application, then that dedicated application will be launched as the "welcome application" as described in the parent application "A Mobile Computer System with A Robust Expansion Capability", filed on Aug. 12, 1999, having Ser. No. 09/374,056.

Power Supply User Interface

To allow a user of a mobile computer system monitor the power status of the mobile computer system, many mobile computer systems provide a "battery gauge". A battery gauge is a graphical user interface device that provides an approximation of the remaining battery power using a familiar automobile fuel gauge type of visual representation.

To create the battery gauge graphical user interface, the mobile computer system must measure some characteristic of the battery and convert that measured characteristic into an easily understandably linear gauge. One method of performing such a measurement and conversion is to measure the battery voltage convert that value into a percent of battery power remaining. The relationship between the batteries voltage and the amount of battery power remaining is not linear. Thus, some type of function or mapping is used to convert the battery voltage into a linear power representation.

Figure 6:
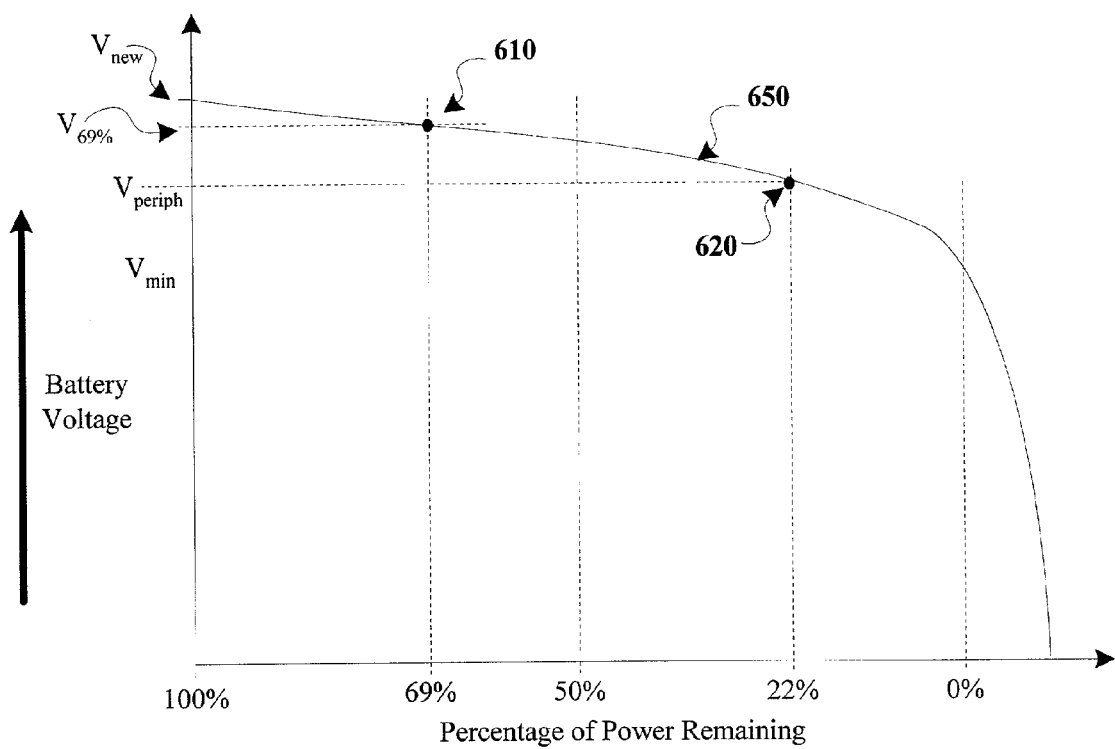
FIG. 6 illustrates a conversion graph for mapping a measure battery voltage value into a percent of power remaining amount.

FIG. 6 illustrates a graph that maps a battery voltage value to a percent of battery power remaining. As illustrated in FIG. 6, a measured voltage value on the vertical axis is mapped to a percent value on the horizontal axis with graph line 650. For example, a new battery with a voltage of $V_{new}$ maps to one hundred percent (100%). As the voltage of the battery drops due to usage, the corresponding percent value also drops. For example, when the voltage of the battery drops to $V_{69\%}$ volts, the corresponding battery power is sixty-nine percent (69%) as shown by point 610 on graph line 650. The electronics of the mobile computer system do not operate once the battery voltage drops below $V_{min}$ volts. Thus, $V_{min}$ defines the zero percent (0%) battery power value.

The conversion mapping system of FIG. 6 operates for a fixed system that cannot have additional peripherals added. However, if a peripheral that consumes power from the mobile computer system's battery is added, the conversion graph of FIG. 6 is no longer accurate. When a power consuming peripheral device is added to the mobile computer system of FIGS. 1 and 2, that added peripheral device will cause a voltage drop that will not be accurately taken into account by the graph of FIG. 6. For example, if a peripheral is added to a mobile computer system with a battery voltage of $V_{69\%}$ volts, the resulting battery voltage may be $V_{periph}$. This voltage maps onto graph 650 at point 620 such that the battery power will appear to drop to twenty-two percent (22%). Although the available battery power should drop a bit since the peripheral will cause the battery to deplete faster, the percentage drop is not that sharp.

To remedy this situation, the system of the present invention uses the information provided by the "hsCardPowerCmdAddLoad" and "hsCardPowerCmdRemoveLoad" commands to monitor the power usage of peripheral. The system then incorporates that power usage information to adjust the battery voltage to battery power percentage conversion.

"No-Load Voltage" Implementation

Figure 7:
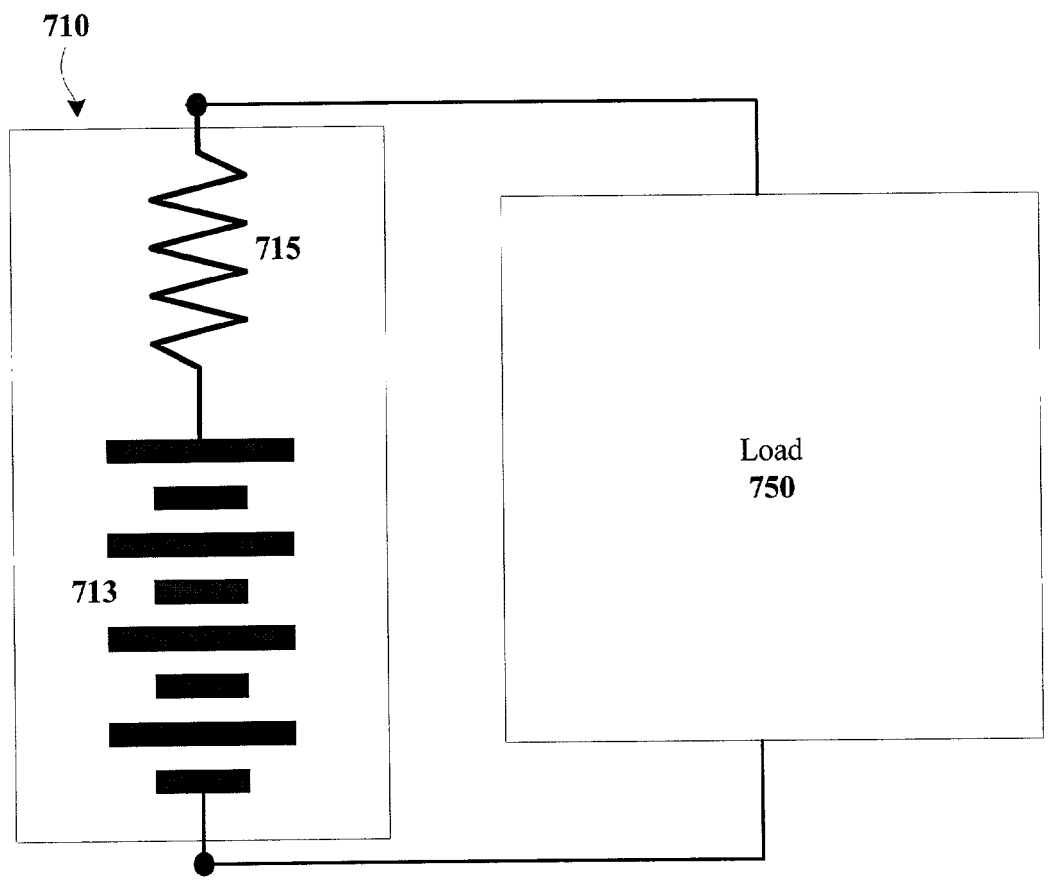
FIG. 7 illustrates a battery that is modeled as an ideal voltage source in series with an internal resistance value.

In one embodiment, the battery voltage meter adjustment is made using a "no-load voltage" wherein a battery is modeled as an ideal voltage source. The basic idea is to measure a real voltage of the battery and then calculate the "no-load voltage" of the battery. The system then converts the calculated no-load voltage value into a percent value using a voltage-to-percent battery curve such as the one illustrated in FIG. 6. The "no-load voltage" is a voltage value for the battery if there were no load applied to the battery. The no-load voltage calculations model a real battery as an ideal voltage source 713 (the "no-load voltage") in series with a small resistor 715 (the internal resistance of the battery) as illustrated in FIG. 7.

As the battery drains, the no-load voltage decreases. In the model for Lithium-Ion batteries, the internal resistance (modeled as resistor 715) remains essentially constant throughout the life of the battery. In the model for alkaline batteries, the internal resistance (modeled as resistor 715) rises slightly as the battery drains. In one embodiment, the software uses one of these two different models of the internal resistance depending on the battery technology of the device.

$$V_{NL} = V_{meas} + R_I \times I$$

where:
- $V_{NL}$ is the no-load voltage of the battery;
- $V_{measd}$ is the measured voltage of the battery;
- $R_I$ is the internal resistance of the battery; and
- I is current drawn by the load 750.

A simple example is hereby provided to describe one implementation. The exact values in different implementations will vary. In mobile computer system, the operating system may measure a voltage ($V_{measd}$) of 3.0 volts across the battery 710 or load 750 with a current load of 0.1 amps. If the internal resistance ($R_I$) of the battery 710 is assumed to be 1 ohm (again, internal resistance value depends on the battery type and freshness), then there must be a 0.1 volt drop (0.1 amps*1 ohm) across the internal resistance 715 of the battery 710. This means that the no-load voltage of the battery 713 is actually 3.1 volts since:

$$V_{NL} = V_{meas} + R_I \times I$$

$$V_{NL} = 3.0V + 1\Omega \times 0.1 \text{ amp}$$

$$V_{NL} = 3.0V + 0.1V = 3.1V$$

The percent of battery power remaining can be then determined by looking up 3.1 volts in a voltage to percent table based upon the graph of FIG. 6.

With the no-load voltage system of calculating a battery power percentage, the battery gauge will not be effected when a person adds or removes a load provided the operating system is informed about the added or removed load. For example, a user might add a peripheral device that adds additional load causing the current to go up to 0.2 amps. The additional load could cause the voltage value measured across the load to suddenly go down to 2.9 volts. The voltage drop across the internal resistance 715 could be calculated as 0.2 volts (0.2 amps*1 ohm), so the no-load voltage across the battery 713 would again be calculated as 2.9 volts+0.2 volts=3.1 volts—yielding the exact same battery percent. Thus the additional load does not affect the calculated no-load voltage of modeled battery 713.

In the present invention, the system software uses the hsCardPowerCmdAddLoad and hsCardPowerCmdRemoveLoad calls in order to determine the present load on the battery. As set forth previously, the internal resistance is determine based on the type of battery technology used and the approximate freshness of the battery. The loaded voltage is always measured. With these three pieces of information (the known load on the battery, the internal resistance of the battery, and the measured voltage load), the operating system can calculate the no-load voltage of the battery 715. The no-load voltage may then be used to generate a battery power percent value using a look-up table.

Peripheral Device Power Management Examples

To further describe how the power management system of the present invention may be used, a couple of examples are provided with reference to peripherals with different power management systems.

Dual Power Mode Peripheral

One method of handling power management in a peripheral device that may be placed into an earlier mobile computer system with limited power or a later mobile computer system having more power is to have different modes of operation. For example, the peripheral may operate in a limited capacity that uses less power if it is placed in an earlier mobile computer system with limited power. However, if the peripheral device is installed into a newer mobile computer system with the additional power, the peripheral device may operate in a full capacity that consumes additional power.

Battery Powered Peripherals with Limited Battery-Less Operation

Another method of handling power management in peripheral device that requires more power than the original expansion interface provides is to have the peripheral device have its own self-contained power source that may be used when necessary. In such a system, the peripheral device may consume power from the mobile computer system's battery or from its own self-contained power source if the peripheral device is installed into a newer mobile computer system. In one embodiment, the mobile computer system first consumes power from its own self-contained power source and then consumes power from the mobile computer system's battery once the peripheral device's own self-contained power source is depleted. The user may be informed of the depleted power supply and specify if the mobile computer system's battery should be used to power the peripheral device.

If such a peripheral device is installed into an older mobile computer system that does not provide the additional needed power, the peripheral device must use its own self-contained power source. If that self-contained power source does not have sufficient power, the peripheral device will not operate.

Peripheral devices that have their self-contained power source may be recharged through the expansion interface. Specifically, as set forth in FIGS. 2 and 3, the expansion interface includes access to electrical pins ($V_{DOCK}$) that receive power from a docking cradle when the mobile computer system rests in a charging docking cradle.

The foregoing has described a method and apparatus for implementing a robust external interface for a computer system. It is contemplated that changes and modifications may be made by one of ordinary skill in the art, to the materials and arrangements of elements of the present invention without departing from the scope of the invention.

We claim:

1. A method of providing power management for a computer system having an expansion port, said method comprising:
   - detecting a peripheral device inserted into said expansion port of said computer system, said peripheral device requiring a first amount of power to operate;
   - receiving a query from said peripheral device for a version of said expansion port, said version indicating a second amount of power that said expansion port can supply, said second power amount not being equal to said first power amount;
   - executing a power test routine to ensure that said computer system can provide said second power amount through said expansion port of said computer system; and drawing power from said expansion port of said computer system only if said power test routine indicates that said second power amount is available from said computer system.

2. The method as claimed in claim 1, said method further comprising:
registering an amount of power that will be drawn by said peripheral device with an operating system in said computer system.

3. The method as claimed in claim 2 wherein the operation of a program that generates a display of the amount of power available from a power source of said computer system is affected by said amount registered.

4. The method as claimed in claim 3 wherein said program generates the display by calculating a no-load voltage of the power source where no load is applied to the power source.

5. The method as claimed in claim 2, said method further comprising:
registering, with an operating system in said computer system, an amount of power that will no longer be drawn by said peripheral device when said peripheral device is removed from said computer system.

6. The method as claimed in claim 4 wherein said program models the power source as an ideal voltage source comprising a voltage source and an internal resistance, calculates the no-load voltage of the power source using the measured voltage of the power source and the value of the internal resistance, and converts the calculated no-load voltage into an amount of power available from the power source.

7. The method as claimed in claim 6 wherein internal resistance varies over time.

8. A mobile computer system comprising:
a processor;
an expansion port for allowing peripheral devices to be coupled to said mobile computer system; and
a memory unit coupled to said processor for storing sets of instructions executable by said processor, said sets of instructions comprising instructions for:
detecting a peripheral device inserted into said expansion port of said computer system, said peripheral device requiring a first amount of power to operate;
receiving a query from said peripheral device for a version of said expansion port, said version indicating a second amount of power that said expansion port can supply, said second power amount not being equal to said first power amount;
executing a power test routine to ensure that said computer system can provide said second power amount through said expansion port of said computer system; and
drawing power from said expansion port of said computer system only if said power test routine indicates that said second power amount is available from said computer system.

9. The mobile computer system as claimed in claim 8 wherein said sets of instructions further comprises instructions for allowing said peripheral device to register an amount of power consumption.

10. The mobile computer system as claimed in claim 9, said mobile computer system further comprising:
a screen display for displaying information, wherein said sets of instructions further comprises display instructions for generating a display of the amount of power available from a power source of said computer system on said screen display based upon said amount of power consumption registered.

11. The mobile computer system as claimed in claim 10 wherein said display instructions calculate a no-load voltage of the power source where no load is applied to the power source.

12. The mobile computer system as claimed in claim 11 wherein said display instructions model the power source as an ideal voltage source comprising a voltage source and an internal resistance, calculates the no-load voltage of the power source using the measured voltage of the power source and the value of the internal resistance, and converts the calculated no-load voltage into an amount of power available from the power source.

13. The mobile computer system as claimed in claim 12 wherein internal resistance varies over time.

14. The method as claimed in claim 1 wherein:
said version indicates that said expansion port is configured for an older device having fewer functions or lower processing rates than said peripheral device; and
said second power amount is less than said first power amount.

15. The method as claimed in claim 1 wherein said peripheral device is operating at a first power consumption mode, the method further comprising:
after drawing power from said expansion port, determining that an amount of power that said computer system can provide is below a predetermined threshold level; and
switching said peripheral device to a second power consumption mode that requires less power than said first power consumption mode.

* * * * *